UNITED STATES PATENT OFFICE.

WILLIAM R. BRIXEY, OF SEYMOUR, CONNECTICUT.

MANUFACTURE OF CRUDE KERITE.

SPECIFICATION forming part of Letters Patent No. 714,858, dated December 2, 1902.

Application filed April 18, 1902. Serial No. 103,582. (No specimens.)

*To all whom it may concern:*

Be it known that I, WILLIAM R. BRIXEY, of Seymour, in the county of New Haven and State of Connecticut, have invented certain Improvements in the Manufacture of Crude Kerite; and I hereby declare that the following is a full, clear, concise, and exact description of my improvements and of the manner in which they may be put into use.

Crude kerite is the basic component of a compound which when it is made complete by the combination with it of india-rubber at a vulcanizing heat forms the product known as "kerite," and constitutes an insulator of recognized superiority and durability for electric wires and cables and all other electrical uses, the india-rubber furnishing the insulating property and the crude kerite imparting the necessary permanency and the capacity to resist deteriorating influences.

In its composition previous to my improvements crude kerite was a mixture consisting, essentially, of cotton-seed oil, linseed-oil, coal-tar, bitumen, asphalt, and sulfur, the latter being employed partly in its ordinary form and partly in the form of sulfid of antimony and the combined ingredients being subjected to high temperatures for the requisite heating periods to thoroughly incorporate them into a homogeneous body and vulcanize the mass.

Both crude kerite and kerite were originally invented and introduced into use by the late Austin G. Day. He gave them these names, and many Letters Patent of the United States were granted to him from time to time for his inventions in relation to them. In his manufacure and use of each of the products he met with much success, and his best practice and results were always obtained with substantially the above-stated compound of cotton-seed oil, linseed-oil, coal-tar, bitumen, asphalt, and sulfur heated and vulcanized as set forth. I succeeded to his business and to the ownership of his patents, and by long-continued manufacture of his kerite products and close study of the nature of the elements which enter into them I have discovered that by reconstituting the crude-kerite mixture as made by him and altering it by omitting some of the ingredients of it, adding another one, and changing the temperature and length of several of his heating periods I can produce a crude compound which when combined with the india-rubber to form the finished kerite will give a product that not only far surpasses the Day kerite in electrical resistance, but also can be manufactured at very much less cost.

To enable those skilled in the art to put my improvements into use, I will proceed to describe in detail the manner in which I manufacture the compound.

For an ordinary working batch of the crude kerite—say about one hundred and eighty pounds in all—I generally first take twenty-five pounds of coal-tar and fifteen pounds of asphalt, put them together in a kettle or other suitable boiler or vessel, and heat them up to 350° Fahrenheit for one and a half hours. I next add seventy pounds of linseed-oil to the mixture and again heat the whole to 350° for seven hours. At this stage of the working the three ingredients are well prepared to be united into a homogeneous mass, and I then let the mixture stand over night to allow this union to take place. In the morning they will be found to be thoroughly combined, and I then once more heat the mass up to 240°, and as soon as it reaches this temperature I add to it ten pounds of sulfur, the latter being in its ordinary form and not in the form of a sulfid, and continue the heat at an increased temperature—say about 320°—for about half an hour. At the end of this time I add four pounds more sulfur and run the heat up until the temperature reaches 300° or thereabout, and then put in about fifty-six pounds of talc and keep the heat up at about the same temperature until vulcanization of the entire mass takes place, which will usually be in about one-half to three-quarters of an hour after the talc is added. The batch is now finished and is ready to be poured into molds to cool, or it may be kept in bulk to be mixed with the india-rubber.

From this statement of my process it will be seen that I use no sulfid of antimony or other sulfid and no cotton-seed oil. The omission of the cotton-seed oil is the new feature and the controlling characteristic of my invention, and it is by reason of my leaving this oil out of the compound which was made by Mr. Day, together with the consequent changes in some of his heating periods, that I am enabled to obtain a crude-kerite product which imparts to the finished kerite the very striking superiority herein set forth.

In order to exhibit the differences between my improved method and Mr. Day's mode of working, it may be well to compare my process stage by stage with that described in the last Day patents, which were those issued in 1885.

Mr. Day began his treatment by mixing together for his first step coal-tar or bitumen and cotton-seed oil. For the first stage of my process I omit the cotton-seed oil entirely and mix only coal-tar and asphalt without any oil whatever. Day also used a heating period of three to five hours for his first step. I employ only one and one-half hours for my first mixing. He then for his second step added linseed-oil, and for his best results allowed the preliminary mixture of coal-tar or bitumen and cotton-seed oil to stand over night to cool before putting the linseed-oil in. For my second step I add linseed-oil to my mixture of coal-tar and asphalt and let the combination of the three stand over night. For his third and last step he added sulfur and an amount of sulfid of antimony equal to the sulfur used and heated the mixture for three to five hours or longer. In his actual practice the heat was continued for seven hours. For my third step I add sulfur in its ordinary form, but no sulfid, and heat the mass only half an hour. At the end of that time, for a fourth step, I add more sulfur, and then finally, for a fifth and finishing step, I introduce a considerable quantity of talc, which is an entirely new ingredient in a crude-kerite compound. The talc is obviously not in any sense an equivalent for any of the materials omitted from the Day process, and I have found that it very substantially increases the value of the product.

I am aware that the differences disclosed by this comparison of the processes may not appear material or important unless attention be paid to the significant differences in the results which the processes produce and to the consequent great improvement shown by my compound.

This improvement is manifested, first, in a realized capacity of electrical resistance at least twice as great as that of the former kerite, and, second, in a reduction of not less than forty per cent. in the manufacturing cost of the product. These facts necessarily establish substantial differences in the method of production. At the same time all the valuable properties of the former compound remain unimpaired in my kerite. It possesses the same high capacity to resist the deteriorating influences of the atmosphere, and whether it be employed above or under the ground or beneath the sea it is equally impervious to all the destructive agencies of earth, air, and water, while in respect to the gradual improvement in insulation which kerite exhibits, as is well known, by continued use my product is greatly in advance of the Day compound. The reason of this superiority of my improved kerite is this: Although india-rubber is by itself one of the best insulators known, it possesses no durability for electrical purposes and cannot be used alone. It is therefore necessary to combine the crude kerite with it to give it permanence; but I have discovered that when a crude kerite which contains cotton-seed oil is united with rubber the presence of this oil in the product impairs and lowers to a very great degree the insulating capacity of the rubber, and I have found that by my process of making the crude kerite without the use of cotton-seed oil the crude mixture when combined with the rubber does not impair the insulating capacity of the latter to nearly such an extent as it otherwise would. It is in consequence of this that my product possesses the high electrical resistance which I claim for it.

The addition of the talc to the other ingredients is not absolutely necessary to the making of a good compound; but its use will be found to give such an increased adhesiveness to the crude material and to render the latter so much better adapted to combine with the india-rubber to produce the finished kerite that I strongly recommend its employment in all cases.

I do not confine myself to the precise proportions here given for the different ingredients, as these may be varied within certain limits, so long as the results which I have arrived at are obtained. The temperatures and heating periods may also be somewhat altered, provided such changes do not impair the improved properties of the mixture; but the example of working which I have here given is the outcome of considerable practical experience in the manufacture of the material and will always be found to produce the best results.

Having thus made known my improvements, what I claim as new, and desire to secure by Letters Patent, is—

1. The above-described process of making a crude-kerite compound by mixing together coal-tar, asphalt, linseed-oil and sulfur, and heating and vulcanizing the mixture substantially in the manner herein set forth.

2. The process of making a crude-kerite compound by combining talc with a mixture of coal-tar, asphalt, linseed-oil and sulfur, and heating and vulcanizing the mixture substantially as above described.

WILLIAM R. BRIXEY.

Witnesses:
J. E. PALMER,
GEO. F. PORTER.